United States Patent [19]
Keller et al.

[11] 3,727,074
[45] Apr. 10, 1973

[54] SWITCHING ARRANGEMENT RESPONSIVE TO ELECTRICAL CHARGE

[75] Inventors: Helmut Keller, Renningen; Horst Gschwendtner, Esslingen, both of Germany

[73] Assignee: Robert Bosch GmbH, Stuttgart, Germany

[22] Filed: Aug. 13, 1971

[21] Appl. No.: 171,591

[30] Foreign Application Priority Data

Aug. 22, 1970 Germany..................P 20 41 800.2

[52] U.S. Cl. ....................307/125, 320/40, 320/43, 324/29.5, 324/76 A
[51] Int. Cl. ..............................G01r 19/00
[58] Field of Search.......................307/125, 131; 324/48, 29.5, 76 R, 76 A; 320/40, 39, 43

[56] References Cited

UNITED STATES PATENTS

| | | | |
|---|---|---|---|
| 3,484,681 | 12/1969 | Grady et al. | 324/29.5 |
| 3,475,061 | 10/1969 | Steinkamp et al. | 320/40 X |
| 3,564,382 | 2/1971 | King et al. | 320/48 X |
| 3,621,359 | 11/1971 | Schnegg | 320/48 X |
| 3,609,503 | 9/1971 | Burkett | 320/40 X |

Primary Examiner—Robert K. Schaefer
Assistant Examiner—William J. Smith
Attorney—Michael S. Striker

[57] ABSTRACT

An arrangement for generating an electrical switching process when a predetermined quantity of electrical charge has passed through an electrical conductor. A resistor used as a measuring element is connected in series with the electrical conductor, and the voltage appearing across the resistor is applied to an integrator. The switching device in the form of a trigger circuit provides a trigger signal when the output voltage from the integrator has attained a predetermined threshold magnitude. This threshold magnitude is selectable in correspondence to a predetermined and selected quantity of electrical charge to be passed through the electrical conductor. The trigger signal is also used to clear the integrator circuit.

15 Claims, 4 Drawing Figures

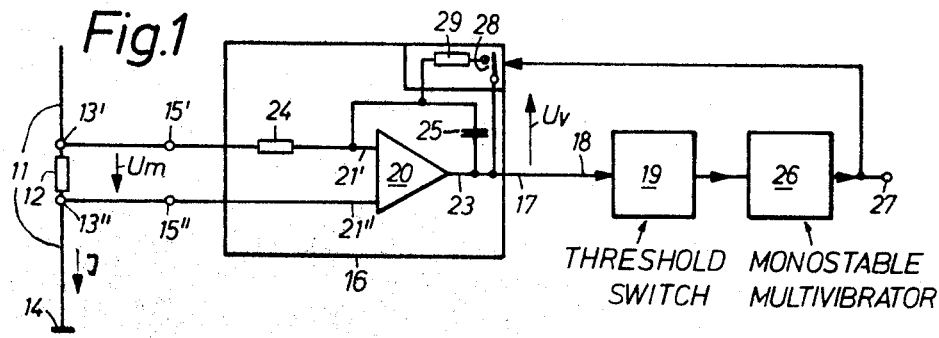
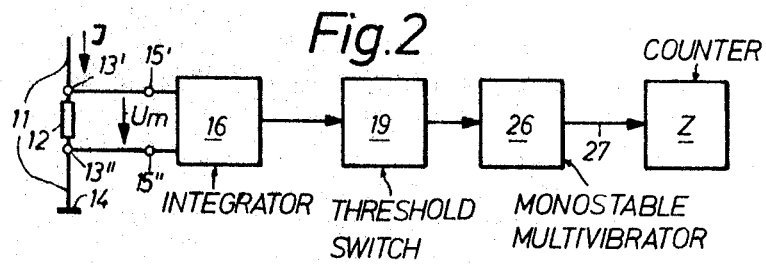
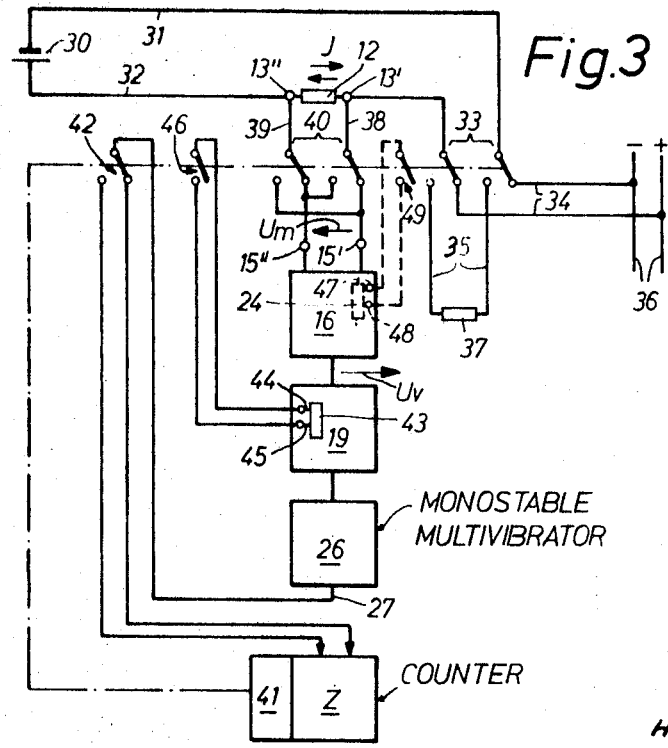

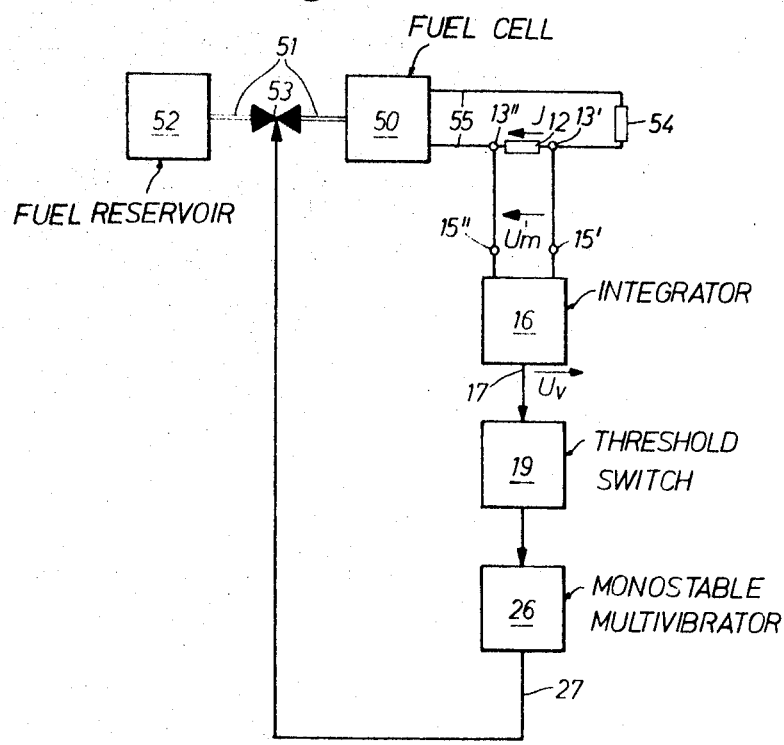

SWITCHING ARRANGEMENT RESPONSIVE TO ELECTRICAL CHARGE

BACKGROUND OF THE INVENTION

The present invention relates to a circuit arrangement for generating an electrical switching process in dependence of a predetermined quantity of electrical charge through an electrical conductor.

With the circuit arrangement of the preceding species, it is possible to produce and detect electrical charge, and to control, indicate or regulate, processes as a function of the magnitude of such charge.

Heretofore in the art, arrangements for handling electrical charge quantities through the use of ampere/hour counters, have been in the form of electrolytic counters or electromagnetic motor type counters. Such counters are relatively complex in design and construction. Aside from this, such counters are not capable of carrying out control or regulating processes as a function of a predetermined quantity of electrical charge.

Accordingly, it is the object of the present invention to provide an arrangement for accomplishing such control or regulating processes without the accompanying disadvantages.

The object of the present invention is carried out by providing a measuring resistor within the electrical conductor, and allowing the voltage appearing across this measuring resistor to be applied to an integrating network. The switching process is carried out through a voltage-dependent switch which is sensitive to a varying potential dependent upon the integrated value from the integration network. Furthermore, to carry out the switching function, a predetermined threshold value must be attained, and by selecting this threshold value, the electrical charge quantity may be limited. The switching process is also used to clear the integration network.

SUMMARY OF THE INVENTION

An arrangement for generating an electrical switching process which is dependent on a predetermined quantity of electrical charge passing through an electrical conductor. A resistor performing a measuring function is connected in series with this electrical conductor, and the electrical charge is also passed through this resistor. An integrating network is connected across the resistor for receiving the voltage of the resistor. This voltage is a function of the electrical charge and hence current flowing through the resistor. A switching device or trigger circuit is connected to the output of the integrating network, and will provide an output signal when the integrated voltage from the integrating network has attained a predetermined threshold magnitude. This threshold magnitude may be selected in the trigger circuit, and hence the quantity of electrical charge passed through the conductor and resistor may be regulated or limited. The signal output from the trigger circuit is also used to clear the integration network from its integrated voltage output.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic diagram and shows structural details of the present invention;

FIG. 2 is a schematic block diagram of the general concept of the present invention;

FIG. 3 is a schematic diagram of an embodiment of the present invention in which an electrical storage battery is used for monitoring charging and discharging processes; and FIG. 4 is a schematic diagram and shows an embodiment for metering of fuel for a fuel cell, in accordance with the present invention.

DESCRIPTION OF THE PREFERRED EMBODIMENTS

Referring to the drawing and in particular to FIG. 1, the circuit diagram showed therein is to undergo a switching process when a predetermined electrical charge or electrical current has moved to the electrical conductor 11. The conductor 11 contains for this purpose a measuring resistor 12 having terminals 13', 13" across which a voltage appears when a current I flows through the conductor 11 and thereby the resistor 12, towards ground connection 14. Connected across the terminals 13', 13" of the resistor 12 is an integration network 16 having an output 17 which provides a voltage $U_v$ which is dependent upon the integrated value. The output 17 of the integrator 16 is applied to the control input 18 of a voltage dependent switch 19 which provides the aforementioned switching process. In order to produce this switching process, the potential of the input 18 of the switch 19 must exceed a predetermined threshold value. By appropriately selecting this threshold value, it is possible to limit the electric current through the conductor 11 and thereby the resistor 12.

In the preferred embodiment, the integrating network 16 has a conventional operational amplifier 20 with the terminals 21', 21" connected across the input 15', 15". The output 23 of this amplifier is connected to the output 17 of the integrating circuit. A resistor 24 is connected between the terminal 21' and 15'. Aside from this, a feedback capacitor 25 is provided between the terminal 21' and the terminal 23. The operational amplifier 20 is driven so that the capacitor electrode connected to the terminal 23 is positive in relation to that electrode of capacitor 25 connected to the terminal 21'.

The voltage dependent switch 19 is preferably of the design in the form of the conventional Schmitt trigger circuit. This circuit then provides a pulse at its output when the circuit triggers or switches. In order to obtain a sufficiently large and well-defined pulse, it is desirable to provide a conventional monostable multivibrator 26 at the output of the Schmitt trigger circuit. The pulse output from the monostable multivibrator on the terminal 27, is then the usable pulse.

The switching process which the voltage dependent switch 19 undergoes, is simultaneously used to clear the integrating network 16. For this purpose, a circuit path 28 is provided connecting the terminal 27 and forming a series circuit with the resistor 29 and shunting feedback capacitor 25. The resistor 29 serves as a discharge resistor for the capacitor.

In operation of the circuit described above, assume that the switching process is to take place when a quantity of charge of one ampere second has past through the conductor 11. When a current I of 0.5 ampereres has flowed for 1 second, the voltage appearing across resistor 12 and thereby across resistor 24 and amplifier 20, must charge the capacitor 25 only to the extent that the threshold value set in the switch 19 has not as yet been exceeded through the voltage $U_v$ across the capacitor 25. The feedback capacitor 25 thereby remains charged, and the corresponding potential $U_v$ remains at the output 17 of the integrating network 16. Here, now, the conductor 11 experiences a new current I of, for example, a magnitude of 2 amperes; then the charge across the feedback capacitor 25 rises, as does the potential $U_v$ at the output 17 of the integrating network 16 after 0.25 seconds. The rise in these values is such that the preset threshold value within the voltage dependent switch 19 is attained and the switching process is thereby carried out. As a result of this switching process, a pulse of definite magnitude appears at the output 27 of the multivibrator 26. Since this pulse is also used for switching purposes within the circuit path 28, the feedback capacitor 25 can discharge across the resistor 29 in response to of the pulse in the circuit path 28. Thereafter, the circuit is again in a state of readiness to again detect a predetermined quantity of electrical charge as a function of a further ampere second and to provide a pulse at the output 27 of the multivibrator 26.

It can therefore be said in general that a potential $U_v$ having the magnitude of the selected threshold value $t$, corresponds to a pulse of predetermined magnitude $$K\int_0^t I dt$$

where K is a fixed constant dependent upon the circuit components used; I is the current through the conductor 11 and resistor 12; and $t$ is time. In a further development of the circuit of FIG. 1, identical circuit elements and operational functions, as well as switching groups, are provided with identical reference numerals and these are not again described.

In FIG. 2, a counter Z operates in conjunction with the output 27 of the monostable multivibrator 26. The pulse generated by the switch 19 and taken at the output 27 of the multivibrator 26, is thereby used to influence the counter Z. The counter can thus be used in an advantageous manner to advance in response to the applied pulse and, when necessary, this counter can be designed in the form of a digital counter for the purpose of indicating the measured quantity.

In operation of the circuit of FIG. 2, the counter Z is advanced by one step when a predetermined electrical charge has past through the resistor 12, and a pulse of the monostable multivibrator 26 has appeared at the output 27 in dependency thereon. In the example being considered, the direction of the current I and the constant K are uniquely determined so that the number of pulses applied to the counter Z can be established as a quantized product of current and time.

In the embodiment of FIG. 3, a storage battery 30 is used for monitoring the charging and discharging process that takes place in the switching arrangement of FIG. 1. The storage battery 30 has two connections 31 and 32 which lead to a two-pole switch 33. This switch can selectively switch to a charging circuit 34 or a discharge circuit 35. The measuring resistor 12 is connected in series with the circuit path 32. The charging circuit 34 stems from a DC network 36, whereas the discharge circuit 35 is applied across a load resistor 37. A further two-pole switch 40 is connected through circuit paths 38 and 39 to terminals 13' and 13'', respectively. This switch 40 is used to reverse the terminals 13', 13'' when applied to the terminals 15', 15'' of the integration network 16. As an example of this arrangement, the resistor 12 has its terminal 13' connected to the terminal 15', and its terminal 13'' are connected to the input terminal 15'', during the charging process. During the discharge process, however, the terminal 13' of the resistor is connected to the input terminal 15'', whereas the terminal 13'' is connected to the input terminal 15'. The control pulse is here again taken at the output 27 of the monostable multivibrator 26 and applied to the counter Z. The counter Z in this case is a conventional unit capable of counting in the forward and reverse directions, and the counting direction is made dependent upon the direction of the current through the resistor 12. The counter Z is, in addition, provided here with a switching device 41, whereby the counter carries out a particular switching function when a predetermined count has been attained. The switching device 41 is, accordingly, in operative connection with the counter Z so that when the counter has advanced a predetermined number of steps in the forward direction, specific switching functions may be carried out. At the same time, such switching functions can also be carried out when the counter Z has gone through the an equal number of steps in the reverse direction, for example. For purposes of illustration the switching function takes place at the end of the forward count so that the switch 33 connects properly the storage battery 30 with the discharge circuit 35, and the switch 40 connects appropriately the terminals 13' with the input terminals 13'' as well as the terminal 13'' with the input terminal 15''. At the end of the reverse count, on the other hand, the switching function is such that the switch 33 connects appropriately the battery 30 with the charging circuit 34, and the switch 40 connects appropriately the terminal 13' at the input terminal 15' and the terminal 13'' is connected with the input terminal 15''. In this example, furthermore, a switch 42 is provided so as to be actuated by the switch 41. This makes possible that the counter Z is set in correspondence to the direction of the count through the resistor 12 at the end of the current counter so that it can then count in reverse. At the same time, the counter is set to count in the forward direction when the end of the reverse count has been reached.

When the electrical storage unit 30 is in the form of a battery as in the illustration, and an equal number of counting steps are used for monitoring the charging process as well as the discharge process, the ampere/hour capacity of the battery must be taken into account, since such a battery must be capable of taking a larger quantity of electrical charge when the charging process takes place, than is taken from the battery during discharge. This requirement for the operational conditions of the battery can be taken into account provided that the switching device 41 cooperating with the counter Z decreases the threshold value in the switch 19 at the same time that it switches to the discharge process. The decrease in the threshold value can be made such that it is fitted to the ampere/hour capacity. To accomplish this switching feature in this example, a resistor 43 with terminals 44 and 45 can be supplied within the voltage dependent switch 19. These terminals 44 and 45 are then connected to a switch 46 which short-circuits the resistor when actuated by the switching device 41.

To take into account the ampere/hour operating capacity, it is also possible to provide that the switching device 41 when switching to the discharge process, simultaneously provides that a higher amplification of the integration network takes place. In this manner, the integrated value in the form of the potential $U_v$ is used for adjusting the ampere/hour operating function. This provision can be represented through dashed lines as in the illustrative example. The resistor 24 can, thereby, be provided with two terminals 47 and 48 which, in turn, are applied across a switch 49 which is actuated by the switching device 41. This arrangement results in a simple design and construction.

The provisions described above for taking into account the ampere/hour function, can also be used for taking into account the aging or variation of the storage unit in the form of a storage battery 30. Thus, the discharge processes are counted and a predetermined number of these discharge processes are used to make the threshold value on the voltage dependent switch 16 dependent thereon. Expressed in other terms, the threshold value is adjusted or made dependent upon the predetermined number of discharge processes. At the same time, a stronger variation of the integration network 16 may be accomplished through the integrated value in the form of the potential $U_v$.

In operation of the arrangement of FIG. 3, assume first of all that the storage battery 30 is connected to the charging circuit 34, and that charging has just begun. The measuring resistor 12 has past therethrough current I in the direction of the arrow shown. As soon as a predetermined amount of electrical charge has past through the resistor 12 and has become thereby stored in the battery 30, a switching process is carried by the voltage dependent switch 19, and a pulse appears at the output 27 of the multivibrator 26. In response, the counter Z advances a step in the forward direction. In further charging the storage battery 30, additional counting steps are carried out for equal amounts of electrical charge, until the storage battery 30 has been fully charged and a corresponding number of pulses have been applied to the counter Z. Through the switching device 41, thereupon, the switches 33,40,42 and 46 or 49 are actuated. The storage battery 30 becomes thereby connected to the discharge circuit 35, so that the current I flows through the resistor 12 in the direction indicated by the arrow in the reverse direction. The switch 40 assures that the voltage $U_m$ at the input terminals 15', 15'', as well as the pulse at the output 27 of the monostable multivibrator 26 remains unchanged in polarity. The switch 42, thereby, assures that counting now takes place in the reverse direction. As soon as a predetermined quantity of electrical charge has past through the resistor 12 and has left consequently the storage battery 30, the counter Z advances a step in the reverse direction through the pulse, which is dependent on this quantity of electrical charge, at the output 27 of the multivibrator 26. By further discharging of the storage battery 30, further counting steps are carried out for equal quantities of electrical charge, until a predetermined number of pulses have been applied to the counter Z corresponding to the discharge of the storage battery 30. The switching device 41, thereby, actuates the switch 33,40,42 in 46 or 49. The charging process then begins anew as described above. For illustrative purposes, the switches 33,40,42,46 and 49 have been described in the form of mechanical switches in order to clarify the understanding of these devices. Such switching function, can, however, also be carried out through semiconductor elements.

In the embodiment of FIG. 4, the circuit arrangement of FIG. 1 is used for the purpose of metering the fuel for a fuel cell 50. In its simplest form, the fuel cell 50 is connected through a supply line 51 with a fuel tank or reservoir 52. A distributing device 53 is connected within the supply line 51 and is designed in the form of, for example, an electrically actuated valve. A load resistance 54 is connected to the fuel cell 50 through a load circuit 55. Connected within this load circuit is also the resistor 12. For purposes of controlling the distributing device 53, the pulse appearing at the output 27 of the multivibrator 26 is used. In this regard, the magnitude of this pulse is determined so that when a predetermined quantity of electrical charge has been taken from the fuel cell 50 and the pulse appears thereupon, the distributing device 53 is held opened by this pulse until the fuel cell 50 has received fuel from the reservoir 52, which is equivalent electro-chemically to the quantity of electrical charge.

In operation of the embodiment of FIG. 4, current I is taken from the fuel cell 50 through the load circuit 55. This current I flows through the load resistor 54 and the resistor 12 connected in series therewith, in the direction of the arrow shown. After a predetermined quantity of electrical charge has been taken from the fuel cell 50 and has been past through the resistor 12, the switching device 19 carries out a switching process as a result of the potential $U_v$ appearing at the output 17 of the integrating network 16, as already described in relation to FIG. 1. In view of this switching process, a pulse appears at the output 27 of the monostable multivibrator 26. This pulse actuates the distributing device 53 in the aforementioned manner, whereby the fuel cell 50 receives from the fuel storage tank or reservoir 52 a quantity of fuel which corresponds electro-chemically equivalent to the quantity of electrical charge.

It is also of course possible that in the embodiment of FIG. 4 the distributing device 53 is indirectly actuated through the pulse appearing at the output 27 of the monostable multivibrator 26, in a further development of this embodiment. Thus, similar to the embodiment of FIG. 3, a counter with associated circuitry can be provided between the output 27 and the distributing device 53. This counter would then actuate the distributing device 53 first after a predetermined number of counting steps have been advanced.

In the preceding embodiments, it is also possible to provide two integrating networks, and for the purpose of clearing the integrated parameters, a further integrating network may be provided for monitoring the resistor 12.

It will be understood that each of the elements described above, or two or more together, may also find a useful application in other types of switching arrangements responding to a predetermined quantity of electrical charge differing from the types described above.

While the invention has been illustrated and described as embodied in switching arrangements responding to a predetermined quantity of electrical charge, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for monitoring the flow of charge through an electrical conductor, comprising, in combination, resistor means connected in series with said electrical conductor; resettable integration means having an input connected across said resistor means and having an output, and being operative for furnishing at said output an electrical signal having a magnitude proportional to the time integral of the voltage across said resistor means, and being resettable upon receipt of a reset signal; Schmitt trigger means connected to said output of said integration means and operative for generating a monitoring signal when the magnitude of said electrical signal reaches a predetermined value; and monostable multivibrator means having an input connected to the output of said Schmitt trigger means and having an output connected to said integration means, and operative for furnishing to said integration means a reset signal in response to generation of said monitoring signal.

2. The arrangement as defined in claim 1, wherein said integration means comprises an operational amplifier having two inputs a feedback capacitor connected to the output of said operational amplifier and to one input of said amplifier, and at least one resistor connected in series with one input of said amplifier and being also connected to said resistor means in series with said electrical conductor.

3. The arrangement as defined in claim 1, wherein said reset signal is a control pulse.

4. The arrangement as defined in claim 1, including fuel cell means connected in series with said resistor means; and fuel metering means for metering fuel to said fuel cell means, said fuel metering means being controlled in dependence on said monitoring signal.

5. The arrangement as defined in claim 4, including load circuit means connected in series with said resistor means; fuel reservoir means connected to said fuel metering means for supplying fuel to said fuel cell as metered by said metering means; and means connecting said Schmitt trigger means to said fuel metering means so that said fuel metering means is controlled in dependence upon said metering signal.

6. The arrangement as defined in claim 1, including counter means connected to said Schmitt trigger means and actuated in response to generation of said monitoring signal.

7. The arrangement as defined in claim 6, wherein said counter means comprises a digital counter.

8. The arrangement as defined in claim 6, wherein said counting means comprises a forward and reverse counter, the direction of counting by said counter being determined by the direction of current through said resistor means.

9. The arrangement as defined in claim 6, including an auxiliary switching means connected to said counting means and having an output when said counting means has advanced a predetermined number of counting steps.

10. The arrangement as defined in claim 6, wherein said counting means is a counter for indicating the measured quantity of electrical charge.

11. The arrangement as defined in claim 1, including storage battery means furnishing current to said resistor means for monitoring charging and discharging of said storage battery means.

12. The arrangement as defined in claim 11, including a selector switch connected to the terminals of said storage battery means; a load circuit connected to said selector switch and selectively connectable to said storage battery means in one state of said selector switch; and a charging circuit connected to said selector switch and selectively connectable to said storage battery means in the other state of said selector switch.

13. The arrangement as defined in claim 12, including counter means actuated by said signal from said switching means; and auxiliary switching means actuated by said counter means, said auxiliary switching means actuating said selector switch means when said counter means has advanced a predetermined quantity in a predetermined counting direction.

14. The arrangement as defined in claim 12, including means for varying said predetermined value when said auxiliary switching means has been actuated by said counting means.

15. The arrangement as defined in claim 12, including means actuated by said auxiliary switching means for increasing the variation of said integration means when said auxiliary switching means is actuated by said counter means.

* * * * *